United States Patent [19]

Wallgren et al.

[11] 4,228,190

[45] Oct. 14, 1980

[54] METHOD OF MANUFACTURE OF LOW CALORIE MARGARINE HAVING A PROTEIN CONCENTRATE FROM SKIMMED MILK

[75] Inventors: Kurt Wallgren; Tage Nilsson, both of Göteborg, Sweden

[73] Assignee: Mjolkcentralen Arlan, Ekonomisk Forening, Göteborg, Sweden

[21] Appl. No.: 961,926

[22] Filed: Nov. 20, 1978

[30] Foreign Application Priority Data

Nov. 23, 1977 [SE] Sweden .............................. 7713275

[51] Int. Cl.$^2$ .............................................. A23D 3/02
[52] U.S. Cl. ................................... 426/421; 426/603; 426/580; 426/804
[58] Field of Search ................. 426/42, 580, 582, 603, 426/613, 657; 260/120

[56] References Cited

U.S. PATENT DOCUMENTS

| 999,083 | 7/1911 | Baechler | 260/120 |
|---|---|---|---|
| 1,557,181 | 10/1925 | Messmer | 260/120 |
| 3,298,836 | 1/1967 | Ernstrom | 426/582 |
| 3,962,464 | 6/1976 | Sozzi | 426/603 |
| 4,000,332 | 12/1976 | Strinning | 426/603 |
| 4,020,186 | 4/1977 | Edwards | 426/582 |
| 4,051,269 | 9/1977 | Strinning | 426/603 |
| 4,066,800 | 1/1978 | Rosenau et al. | 426/582 |

*Primary Examiner*—Jeanette M. Hunter
*Attorney, Agent, or Firm*—Larson, Taylor and Hinds

[57] ABSTRACT

A method for the manufacture of margarine of the water-in-oil type having a low calorie value and a high content of proteins by emulsifying a water phase containing 20–24% proteins into a fat phase composed of oil and/or fats, at a temperature of about 38°–55° C. to provide a water-in-oil emulsion, comprised of about 35–65% fat phase and 65–35% water phase in which water phase is produced from a raw material comprising skimmed milk, skim milk powder or a mixture thereof by acidifying the raw material to a pH of 4–5 to precipitate protein therefrom, heating the acidified raw material and any admixtures in a first heating stage to a temperature of about 35°–65° C. and maintaining said temperature for a period of at least 15 minutes, then quickly raising the temperature of the acidified milk raw material in a second heating stage to a temperature of about 60°–95° C. and immediately after reaching the intended temperature, separating the precipitated protein and cooling the separated protein to at least the emulsification temperature and emulsifying the water phase thereby obtained in the fat phase to directly form the water-in-oil emulsion.

10 Claims, 1 Drawing Figure

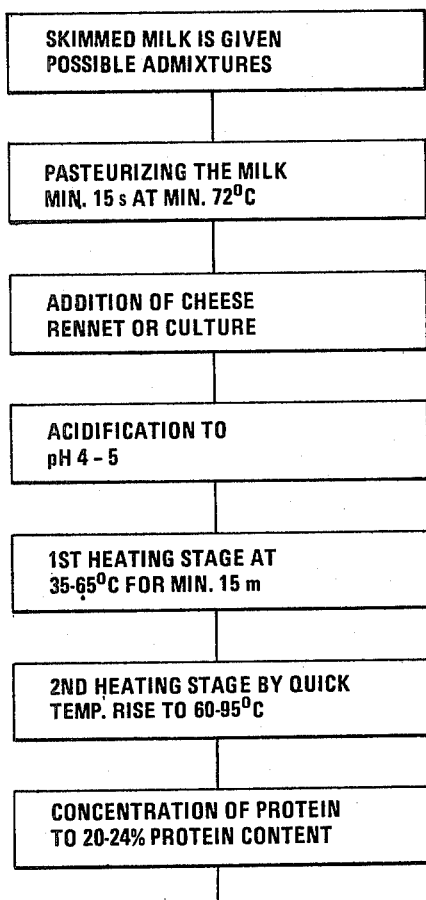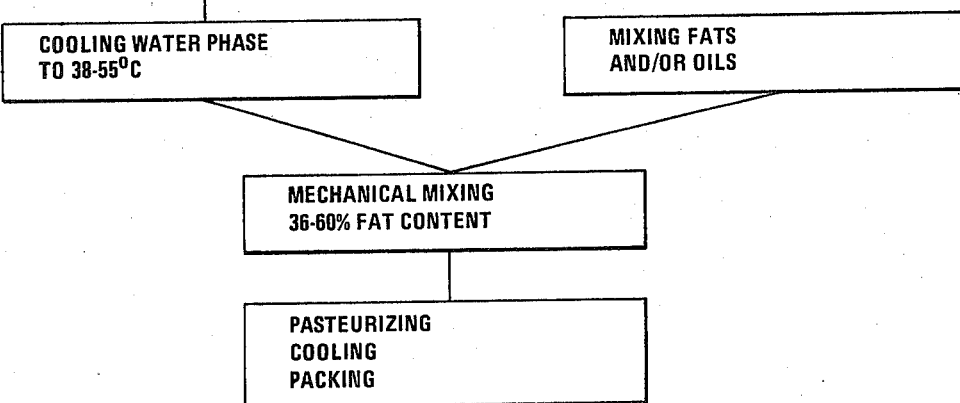

METHOD OF MANUFACTURE OF LOW CALORIE MARGARINE HAVING A PROTEIN CONCENTRATE FROM SKIMMED MILK

BACKGROUND OF THE INVENTION

1. Field of the Invention

The present invention relates to a method of manufacturing low calorie margarine of the water-in-oil type having a low calorie value and a high content of proteins. According to the method of the invention there are produced independently of each other, a protein-containing water phase and a fat phase composed of oils and/or fats and thereafter the water phase is emulsified in the fat phase to directly form a water-in-oil emulsion. More particularly, the invention relates to such method, in which the water phase, in order to give the intended high protein content, is produced from a protein concentrate emanating from skimmed milk.

2. Description of the Prior Art

A method for the production of low calorie margarine of the water-in-oil type is previously known in which a water phase is emulsified in a fat phase and in which the water phase is produced from a protein concentrate from buttermilk emanating from a butter and/or butteroil manufacturing process. Such a protein concentrate from buttermilk has good water keeping properties and emusifying properties and is well suited for the production of low calorie margarine. The supply of buttermilk, however, is relatively restricted whereas the supply of skimmed milk is relatively good. Consequently, it has been desirable to produce a low calorie margarine of water-in-oil type having a high protein content, in which the protein concentrate for said low calorie margarine is obtained from skimmed milk.

A method for the production of low calorie margarine is also previously known in which the water phase is produced with skimmed milk as the starting material and in which the protein comprises milk casein obtained by precipitation with an acid. In this method a water-in-oil emulsion is obtained by dispersing up to 60% water phase in down to 40% fat phase in a closed cooling and crystallization system at a temperature at which the fat begins to crystallize. Before the water phase is dispersed in the fat phase the protein containing water phase is heated to a temperature of between 65° and 80° C. and is kept at said temperature for a period of between 10 and 30 minutes.

This previously known method involves some disadvantages, which are mainly based on the difficulty of obtaining a stable emulsion having as high content of water phase as, for example, up to 60% and the difficulty of obtaining a product having a microbiological keepability. In the known method it is considered necessary to keep the pH-value at a relatively low level and less than 6, and a pasteurization must be made at a high temperature for a long period of time in order to obtain a product which is sufficiently stable and substantially free of microbiological changes. The precipitation of the proteins from the starting material in this method is a time consuming operation and acids must be added. Also in order to make emulsification of the water phase in the fat phase possible the fat phase must be cooled before mixing the two phases together. Furthermore, in the production of the water phase mineral acids and organic acids are added which necessarily influence the composition of the protein concentrate. The added chemicals thereafter must be washed by an expensive and complicated process before the protein concentrate is mixed into the fat phase. As a result a large amount of the valuable so called "whey proteins" are lost since they cannot be precipitated by an ordinary acidification.

Also previously known is a method for the production of a low calorie margarine having a protein concentrate from skimmed milk wherein the milk raw material is first acidified to pH 5.1–5.8 and is thereafter subjected to a membrane filtering, and the resulting protein concentrate is then subjected to a special thermic treatment. By virtue of the membrane filtering a relatively large amount of the whey proteins is obtained which proteins cannot be precipitated by acidification. The whey proteins obtained in this manner change the character of the protein concentrate to give improved water-keeping and emulsifying properties. It is necessary in the membrane process, however, that particular apparatus be available which can be relatively expensive.

Protein concentrate for low calorie margarine of water-in-oil type having a high protein content also can be manufactured from different caseins, but problems appear in such manufacture, for example, bad taste such as a glue taste.

Another possible protein raw material might be quark. It is however, difficult to provide the desired product with sufficiently high dry substance content and protein content using quark as the protein material. Normal quark also is a product which is difficult to handle and which causes difficulties in separation, pumping and cooling. These difficulties are especially accentuated at such long operation periods which are necessary in the manufacture of low calorie margarines on an industrial scale.

Furthermore, quark contains a large number of added bacteria and other bacteria which unfavourably influence the bacteriological quality of the final product and when storing a final product prepared using quark it develops proteinases. This is especially obvious after a free storing and following thawing both of the protein concentrate (the quark) and the ready product (the low calorie margarine). In addition, quark contains rennet enzyme. The bacteria and other enzymes may give poor taste like a cheese taste.

SUMMARY OF THE INVENTION

It is an object of the invention therefore to provide a low calorie margarine having a protein concentrate obtained from skimmed milk which method eliminates the aforementioned problems encountered in the production of low calorie margarine (dairy spread) of the water-in-oil type.

It is also an object of the invention to provide a method for the production of a protein concentrate from skimmed milk which need not be membrane filtered, pasteurized at high temperatures of between 65° and 80° C. for a long period, and be supplied with mineral acids or organic acids, and which must be washed to remove the mineral acids or organic acids from the protein concentrate before use in the manufacture of low calorie margarine.

Further objects of the invention are to obtain a protein concentrate useful as the water phase emulsified with the oil or fat phase in the manufacture of low calorie margarine of water-in-oil type, to reduce viscosity of the protein concentrate at separation and handling, to control the water keping property and the emulsifying property of the protein concentrate, to increase its solid and protein content, to reduce the content of bacteria and to inactivate enzymes, which among other things may give a bad or false taste.

These objects are obtained by subjecting a raw material selected from skimmed milk, skim milk powder or mixtures thereof to a sequence of defined heat treatments after acidifying the raw material to a pH of about 4-5 to precipitate protein therefrom. In accordance with the method the acidified raw material is heated in a first heating stage to a temperature of about 35°-65° C., preferably 52°-55° C. in order to make it possible to subsequently heat the raw material to the highest temperature that the protein can stand without loosing its water-keeping and emulsifying properties. To ensure a sufficiently strong heat treatment the acidified milk raw material is kept at this temperature for a predetermined period (at least 15 minutes). The heat treatment is carried through in heat treatment cells or tanks for the purpose, among other things, of dissociating calcium from the casein. Depending on the gases which are enclosed or dissolved in the milk, foam is formed when the product expands in the heat treatment cell or tank. By floatation, the protein of the milk is thereby drawn upwards to the foam and is partly dehydrated. This foam formation leads to a grain formation and loss of water keeping and emulsifying properties during the subsequent heat treatment separation step of the method of the invention. The foam formation can be prevented in different ways, for instance, by keeping the heat treatment tank or cells under pressure or by using bacteria cultures which give a low content of gas as for instance, cottage cheese culture or cheddar cheese culture. In addition, introduction of air must be minimized through the process until the product is subjected to the commencing heat treatment at 35°-65° C.

The foam formation can also be eliminated by adding a suitable foam-reducing agent like lecithin.

After the first heat treatment at about 35°-65° C. the temperature of the acidified milk is raised to the highest temperature that the protein can stand, preferably to a temperature of about 60°-96° C. at the pH area of 4-5. By the two heat treatments is obtained the intended inactivation of enzymes and bacteria and a control of the water-keeping and emulsifying properties of the protein. After the second heat treatment, that is, immediately after the intended temperature is reached the protein is separated off to provide a protein concentrate having the desired protein and solids contents with the desired water-keeping and emulsifying properties. The separated protein concentrate is then cooled down to at least the emulsification temperature.

The production of the water phase includes eight steps which are preferably carried out successively one after the other. The fat phase production and the emulsification to the low calorie margarine of water-in-oil type may be carried out in three additional steps.

The invention will now be described in more detail with reference to the eight steps.

Production of Water Phase

Step 1

If desired a protein like for instance whey protein or reconstituted milk powder may be added to the skim milk raw material. The raw material may also be given an addition of salts like citrate or phosphate in order to stabilize the albumin and/or to reduce the influence of season variations on the milk.

Step 2

The skimmed milk is subjected to a pasteurizing heat treatment, which may range from a temperature of 72° C. for 15 seconds to an ultra high temperature and a corresponding temperature/time relationship depending on the season and the yield desired.

Step 3

The skimmed milk is preferably given a slight addition of cheese rennet to stabilize the protein particles. Preferably cheese rennet is added in an amount 5-40 ml per 1000 liters of skimmed milk.

Step 4

In this step the skimmed milk is made acid at a suitable temperature by means of non-gas forming acid which consequently does not result in the formation of carbon dioxide or any other gas during the acidification. The milk is acidified to a pH value of between 4 and 5. Cottage cheese or cheddar cheese culture may be added to prevent formation of foam during the following heat treatment.

Step 5

The acidified milk is heated in a first heating step to a temperature of about 35°-65° C., preferably 52°-55° C., and the milk is kept at this temperature for at least 15 minutes and up to 60 minutes or more depending upon the particular temperature employed. At temperatures adjacent the upper temperature limit a short temperature keeping period can be used, but at temperatures adjacent the lower limit the temperature ought to be kept for longer periods. The heat treatment is preferably conducted in a heat exchanger having a minimum temperature difference between the heating medium and the product. By this heat treatment of the skimmed milk the precipitated protein gets a consistency which is suited to separation or to precipitation thereof in any other way, and the heat treatment of the protein gives the protein good water-keeping and emulsifying properties.

Step 6

However, the temperature used in step 5 is too low to enable a separation so as to get a protein having a sufficiently high dry substance content and a sufficiently reduced bacteria and enzyme content. Therefore, the skimmed milk is subjected to a momentary temperature increase up to 60°-95° C., preferably 65°-70° C. This high temperature should be maintained for as short a period as possible, and the temperature rise (generally of at least 10° C.) may be established by steam injection directly into the skimmed milk or onto the tube in which the skimmed milk is transported from the place where it was subjected to the long temperature treatment according to step 5. It is important that the temperature of 60°-95° C. is not maintained but momentarily since otherwise the protein may bake on the equipment at the same time as the protein looses its water-keeping property. Thus grains may be formed or similar problems may appear making subsequent concentration of the protein concentrate difficult. On the other hand, it is important that the skimmed milk be subjected to the increased temperature in the said second temperature step since this reduces the viscosity and thereby facilitates the concentration of the protein concentrate. It has proved that it is possible by the said second temperature treatment to prevent or eliminate the appearance of an unwanted cheese taste.

Step 7

In direct connection to the momentary temperature rise according to step 6 the protein is concentrated as quickly as possible, preferably by being separated. This gives a protein concentrate of 20–24% which mainly contains casein but which also contains some amount of whey proteins. It has been proved that the protein concentrate thus produced has good water-keeping and emulsifying properties and is well suited to the manufacture of low calorie margarine of the water-in-oil type.

Step 8

As previously mentioned, the protein concentrate from skimmed milk is very sensitive to high temperatures and if the high temperature from step 7 is maintained for too long a period the protein quickly grows grainy, its water-keeping property is reduced and whey falls out. It is therefore important that the protein concentrate is cooled, and if the protein concentrate is not used immediately for the manufacture of low calorie margarine, it is important to cool the protein concentrate immediately after the separation to a temperature of less than 8° C. The protein concentrate ought to be used as soon as possible for the manufacture of low calorie margarine, but at a temperature of less than 8° C. the protein may without disadvantage be stored for two or three days.

Instead of using fresh skimmed milk, the method of the invention contemplates use of skim milk powder which as usual is dissolved or reconstituated in water and is thereafter subjected to the above described treatment according to steps 1–8. A protein concentrate produced from skim milk powder gives the same good results as does a protein concentrate produced from fresh skimmed milk. Upon need or if considered advisable a protein concentrate produced from skimmed milk according to the described method may also be mixed with a suitable butter milk protein concentrate for the subsequent manufacture of low calorie margarine.

Production of the Fat Phase

Step 9

Independently of the production of the water phase a fat phase is produced in a way known per se from oils and/or fats. The oils can be butter oil, preferably mixed with oils having a large amount of polyunsaturated fats like soy oil, sunflower oil or other vegetable oils. To the oil mixture or some part thereof can be added such oil soluble additives as, for instance, a small amount of emulsifiers if emulsifiers are to be used. Normally there is need for only a small amount of emulsifier since the protein concentrate produced according to the invention has very good water-keeping and emulsifying property. To the fat phase may also be added vitamins, for instance, in the form of vitaminized oil. The temperature of the fat phase is maintained at a temperature of about 38°–55° C., preferably 45°–50° C. If considered necessary the mixed oils and fats can be stored in a buffer station.

Emulsification

Step 10

In this step the emulsification is performed by successively adding the water phase at a temperature of about 38°–55° C., preferably 45°–50° C., to the fat phase which has the same temperature. The addition of water phase can be made by batches on continuously and is made under vigorous mechanical mixture, whereby the water phase is emulsified in the fat phase to directly form a water-in-oil emulsion. By time a careful check can be made both of the fat content of the emulsion and that the emulsion type is of the water-in-oil type. The fat content is controlled by the addition of water phase so that the fat content falls in the range of 35–65%, preferably 39–41%. In this step aromas or flavoring agents may be added, if desired.

Step 11

After the emulsification the product can be made ready in any conventional way by pasteurizing the product, preferably at 72° C. for 15 seconds although lower temperatures with correspondingly longer period of time or alternatively higher temperature with correspondingly shorter periods can be used. Then the product is cooled to a temperature below 12° C., and the cooled product is packed, hermetically sealed in any conventional way and stored.

In the appended flow scheme is diagrammatically illustrated the flow in the manufacture of a low calorie margarine according to the invention.

The invention shall now be described in connection with a number of practical embodiments.

EXAMPLE I 4500 liters of skimmed milk was heated momentarily to 87° C. and then cooled to 20° C. Thereafter 0.7% cottage cheese acid and 90 ml rennet was added. The coagulate was broken at pH 4.6 and it was thereafter heated to 55° C. and was kept at said temperature for 30 minutes. Thereafter the milk was transferred to a quark separator by means of a positive controllable pump. Just before the separation the temperature of the milk was raised to 68° C. by direct injection of steam. In this case the milk could not stand a higher temperature without the risk of grain formation and loss of water-keeping properties. The separation of the milk was carried out to obtain a protein concentrate of 20–24% which contained both casein and some portion of whey protein. If the water phase thereby obtained is to be used immediately by emulsifying same in the fat phase the water phase is cooled to a temperature of 38°–55° C. or preferably 45°–50° C., but if the water phase is to be stored for up to a few days the water phase is cooled to a temperature below 8° C.

Independently of the water phase production described above, a fat phase was produced by mixing oils and fats, and the water phase was successively mixed into the fat phase with vigorous mechanical mixing and the fat content and the emulsion type was checked. The emulsion was formed by mixing 60% water phase into 40% fat phase, while both the water phase and the fat phase were at a temperature of about 45°–50° C. The resulting mixture was pasteurized in a tank of 72° C. for 15 seconds and thereafter cooled in a two stage scraper cooler, first to a temperature of 18° C. and thereafter to a temperature of 10° C.

The resulting product had a butter-like taste and appearance, was free of hard lumps, and had an even and smooth consistency. The emulsion proved to have good keepability upon storing, and when analyzed and evaluated it proved to be completely comparable to low calorie margarines manufactured according to any other method.

EXAMPLE II

A water phase was produced by reconstituting 450 kg skim milk powder with 1550 liters water. The skim milk powder was allowed to swell at 7° C. for 24 hours. Thereafter an additional 2500 liters of water were added and the milk was heated briefly to a temperature of 87° C. The continued production of the water phase, the productions of the fat phase and the formation of the emulsion was carried out in Example I, and a product was obtained which had good taste and appearance, and was free of lumps and had a smooth consistency. The emulsion of the product was stable, and of the water-in-oil type.

EXAMPLE III

A water phase for low calorie margarine was produced from 20 kg whey protein powder (protein content 65%), dissolved in 50 liters skimmed milk and allowed to swell at 7° C. for 24 hours. Thereafter it was added to 4550 kg skimmed milk. The skimmed milk was heated momentarily to 87° C. and cooled to 20° C. and 0.7% cottage cheese acid and 90 ml rennet was then added. The coagulate was broken at pH 4.6 heated to 55° C. and maintained at this temperature for 30 minutes. Thereafter the temperature was quickly raised to 78° C. by direct steam injection. The elevated temperature could be used without disadvantages for this milk mixture. The milk was separated immediately and treatment continued as in Example I. Again a product was obtained being a stable emulsion and having a smooth consistency without lumps.

EXAMPLE IV

To 4500 liter skimmed milk was added 3 kg dinatriumhydrogen phosphate and 3 kg natrium citrate. The milk was heated momentarily to 87° C. and cooled to 20° C., whereupon 0.7% cottage cheese acid and 90 ml cheese rennet was added. The coagulate was broken at pH 4,6 and it was thereafter heated to 55° C. and was kept at this temperature for 30 minutes. Immediately thereafter the milk was heated to 80° C. by means of direct steam injection and separated. Treatment was continued as in Example I.

Again, a product was obtained being a stable emulsion of the water-in-oil type. The product had a good taste and appearance and a smooth consistency without lumps.

What we claim is:

1. A method for the manufacture of margarine of the water-in-oil type having a low calorie value and a high content of proteins which comprises emulsifying a water phase containing 20-24% proteins into a fat phase composed of oils and/or fats to provide a water-in-oil emulsion comprised of about 35-65% fat phase and 65-35% water phase wherein
    said water phase is prepared by acidifying a raw material selected from the group consisting of skimmed milk, an aqueous solution of skim milk powder and mixtures thereof to a pH of 4-5 to precipitate protein therefrom,
    heating the acidified raw material in a first heating stage to a temperature of about 35°-65° C.,
    maintaining said temperature for a period of at least 15 minutes,
    then quickly raising the temperature of the acidified raw material in a second heating stage to a temperature of about 60°-95° C. and
    immediately after reaching the intended temperature, separating the precipitated protein and
    cooling the separated protein to at least the emulsification temperature to provide said water phase, and wherein
    said fat phase is prepared independently of the production of said water phase by admixing fats and/or oils,
    heating said fat phase to a temperature of 38°-55° C.,
    emulsifying said water phase in said fat phase at a temperature of 38°-55° C. of both phases to directly obtain a water-in-oil emulsion,
    pasteurizing the emulsion thereby obtained and
    cooling and packing the pasteurized water-in-oil margarine.

2. A method according to claim 1, wherein 5-40 ml cheese rennet per 1000 liters of raw material mixture is added to said raw material before the acidification.

3. A method according to claim 1, wherein the first heating stage is conducted at a temperature of 52°-55° C.

4. A method according to claim 1, wherein raising of the temperature in the second heating stage is effected by injection of water steam directly into the raw material or onto the tube in which the raw material is transported.

5. A method according to claim 1, wherein the second heating stage is conducted at a temperature of 65°-70° C.

6. A method according to claim 1, wherein lecithin is added to said raw material in an amount effective to reduce the foam formation during the heating in the first heating stage.

7. A method according to claim 1, wherein whey protein is added to said raw material before the first heat treatment.

8. A method according to claim 1, wherein citrate or phosphate salts are added to the raw material before the first heat treatment in an amount effective to stabilize the albumin and/or compensate for reason variations in said raw material.

9. A method according to claim 1, wherein a culture selected from the group consisting of cottage cheese culture and cheddar cheese culture is added to said raw material before the acidification in an amount of 5-40 ml of said culture per 1000 liters of said raw material.

10. A method according to claim 1, wherein the water phase is cooled to a temperature of less than 8° C. and is stored at such temperature before the water phase is heated to 38°-55° C. and is emulsified in the fat phase.

* * * * *